INVENTORS
John V. Harrington
Paul Rosen
BY Melvin R. Jenney
ATTORNEY

METHOD OF LAND LINE PULSE TRANSMISSION

Filed June 27, 1955 4 Sheets-Sheet 2

INVENTORS
John V. Harrington
Paul Rosen
BY Melvin R. Jenney
ATTORNEY

METHOD OF LAND LINE PULSE TRANSMISSION

Filed June 27, 1955 4 Sheets-Sheet 3

INVENTORS
John V. Harrington
Paul Rosen

BY Melvin R. Jenney
ATTORNEY

Sept. 2, 1958 J. V. HARRINGTON ET AL 2,850,573

METHOD OF LAND LINE PULSE TRANSMISSION

Filed June 27, 1955 4 Sheets-Sheet 4

INVENTORS
John V. Harrington
Paul Rosen
BY Melvin R. Jenney
ATTORNEY

United States Patent Office 2,850,573

Patented Sept. 2, 1958

2,850,573

METHOD OF LAND LINE PULSE TRANSMISSION

John V. Harrington, Lexington, and Paul Rosen, Waltham, Mass., assignors, by mesne assignments, to Research Corporation, New York, N. Y., a corporation of New York Application June 27, 1955, Serial No. 518,078

13 Claims. (Cl. 179—15)

Figure 1:
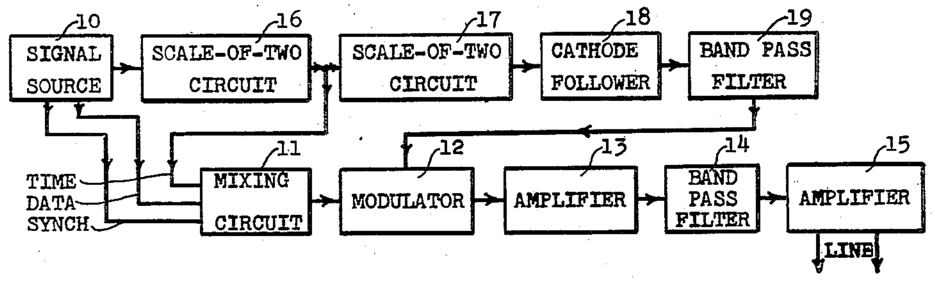

This invention is related to a method for the pulsed transmission of information over land lines and more particularly to the transmission of information in the form of a sequence of coded pulses over commercial telephone lines.

With the development of large scale civil and military information and data handling systems there has grown a need to employ land lines for connections between elements of an information network. However, land lines inherently possess transmission characteristics which impose limitations on the transmission of pulses. To illustrate this point, telephone lines generally are characterized by an increasing attenuation below about 300 C. P. S. and an increasing attenuation above about 2500 C. P. S., an effective frequency transmission band at the most of 200 to 3000 C. P. S. Under these conditions it is exceedingly difficult to transmit only uni-directional pulses and it becomes necessary to resort to the use of pulsed carrier waves, a technique which has long been used for pulse transmission such as is used in teletype or facsimile systems.

For efficient use of the available frequency transmission band, the pulse rate must approach the carrier frequency and hence the pulse to be transmitted is represented by one or two loops of a sinusoidal carrier wave. For maximum information transmission rate only one loop of the carrier can be used. The method of the present invention contemplates the use of an information pulse rate about equal to a carrier wave frequency in the high frequency portion of the line frequency transmission band in essentially a single sideband mode of transmission to obtain higher information transmission rates and more efficient use of the available bandwidth than is obtained by the prior art pulsed carrier transmission methods.

The primary object of the invention is to provide a method for pulsed data transmission over land lines at pulse rates which yield the most efficient use of the frequency transmission bandwidth characteristics of the land line.

A second object is to provide a method of transmission in which the signal contains only frequencies which lie within the effective frequency transmission band of the land line.

When single loop sinusoidal pulses are impressed on a line, the wave form of the output of the line may be badly distorted. The cause of these distortions probably is found in the phase shift characteristics of the line which is found to be non-linear at both the low frequency and high frequency ends of the frequency transmission band. The low frequency delay distortion resulting from non-linear phase shift causes the higher frequency components to arrive first followed by the low frequency components so that the response of the line starts with a high frequency oscillation which gradually becomes of longer period as it damps out. The high frequency delay distortion produces the reverse effect so that the lower frequency components arrive first and the higher frequencies at some time later. This type of impulse response is often loosely called "high and low frequency ringing." In the present method a relatively undistorted pulse response is obtained by filtering the single loop sinusoidal pulse by means of a band pass filter to remove both low frequency components and high frequency components so that the signal spectrum is restricted to frequencies which lie within the usable bandwith of the line where both the phase shift and attenuation characteristics of the line are substantially linear.

Taking the usable bandwith of an average land line as lying between 500 and 2000 C. P. S., common usage has indicated that it is desirable to transmit with a bandwidth of $$\Delta f=\frac{1}{t}$$

where $f$ is cycles per second and $t$ is the duration of the pulse in seconds. This mode of operation renders the receiver's task more simple in detecting the difference between a pulse and a space, since the bandwidth is sufficient to provide adequate pulse definition.

For minimum pulse distortion, double sideband transmission should be used, but examination of the available bandwidth shows that if double sideband transmission is used, the data rate is restricted to about 800 "bits" per second in order to satisfy the pulse definition requirements. If vestigal sideband transmission is used, the data rate can be raised to 1600 "bits" per second, with little degradation of detail between alternate pulses. A penalty is paid, however, in loss of sharpness at the leading edge of the first pulse and the trailing edge of the second pulse. This happens because the so-called quadrature components which are generated when the upper sidebands are partially suppressed cancel midway between the pulses, effecting good detail between pulses; but no cancellation occurs at the leading and trailing edges, causing poor rise and fall times. However, if the no-signal carrier level is not zero, then the effect of the quadrature components becomes less important and satisfactory edge sharpness is obtained giving performance nearly as good as the double sideband case. Consequently the method of present invention contemplates the use of vestigal sideband transmission to obtain the higher information transmission rate of 1600 "bits" per second modulating a 2000 C. P. S. carrier wave synchronous with the data rate and the transmission of some non-zero carrier in the absence of a signal.

Another object of the invention is to provide a method of pulsed data transmission in which the information is detected by pulse amplitude discrimination in combination with the time spacing between pulses.

Another object of the invention is to provide improved apparatus for carrying out the method of the invention.

In general when transmitting information in the form of a sequence of coded pulses, there are at least two kinds of data to convey: the beginning of a "word," called a synch pulse, and the "bits" of information contained in a word, called data pulses, a word being some coherent arrangement of data pulses in accordance with the selected code. For example, when the information to be transmitted is the position of an object, the azimuth angle and range can both be indicated in the form of binary numbers, a "one" being indicated by a pulse and a "zero" by a space. The information can be transmitted by a synch pulse indicating the beginning of a word followed by a sequence of pulses and spaces in accordance with the binary number identifying the azimuth angle followed by the sequence of pulses and spaces identifying the range. Alternately the information can be transmitted in the form of a synch pulse followed by data pulses for azimuth angle then a synch pulse followed by data pulses for range and the sequence of pulses representing azimuth data can be identified by the inclusion of a reference pulse immediately following the synch pulse. In either case the time spacing between all pulses occurring in a sequence of pulses is important for the interpretation of the information being transmitted so that timing data is also required. Timing may be obtained at the receiver by locking a continuously running local oscillator to the synch pulse or by initiating operation of a start-stop oscillator from the synch pulse. Preferably the timing may be transmitted in the form of a train of regularly recurring pulses.

Thus it is seen that the wave form of the transmitted signal must possess characteristics by which synch (and reference) pulses, data pulses and timing pulses can be recognized at the receiver. In the present system the synch pulse and the reference pulse are transmitted with twice the amplitude of the data pulses and timing is also inserted as a modulation on the carrier with an amplitude about one-tenth that of a synch pulse. The multiple amplitude signal formed in this way possesses the required characteristics for identification at the receiving end.

Other features of the invention consist of certain novel combinations and arrangements of parts hereinafter described and particularly defined in the claims.

Figure 2:
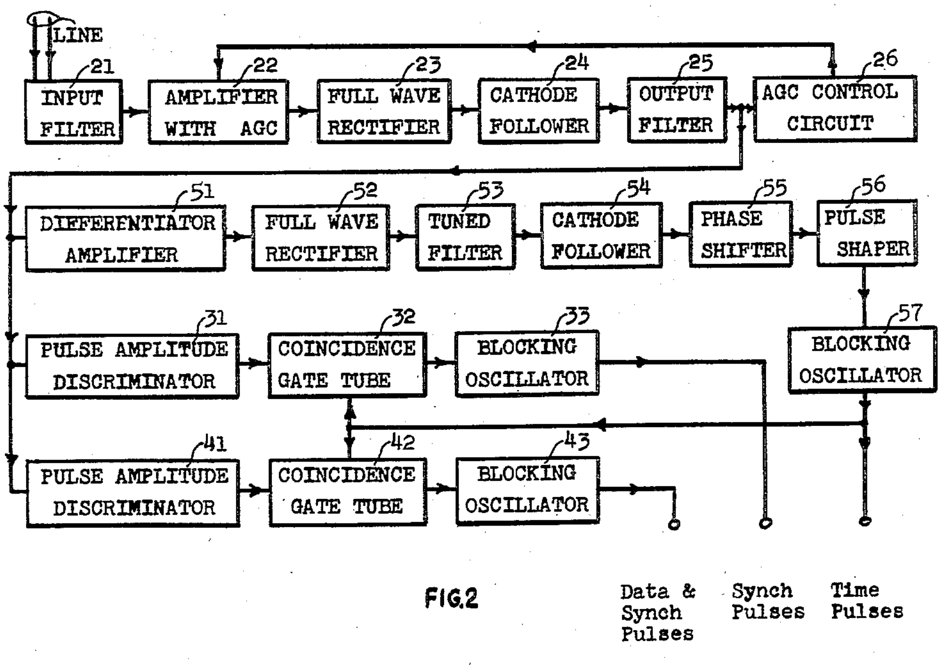
Figure 3:
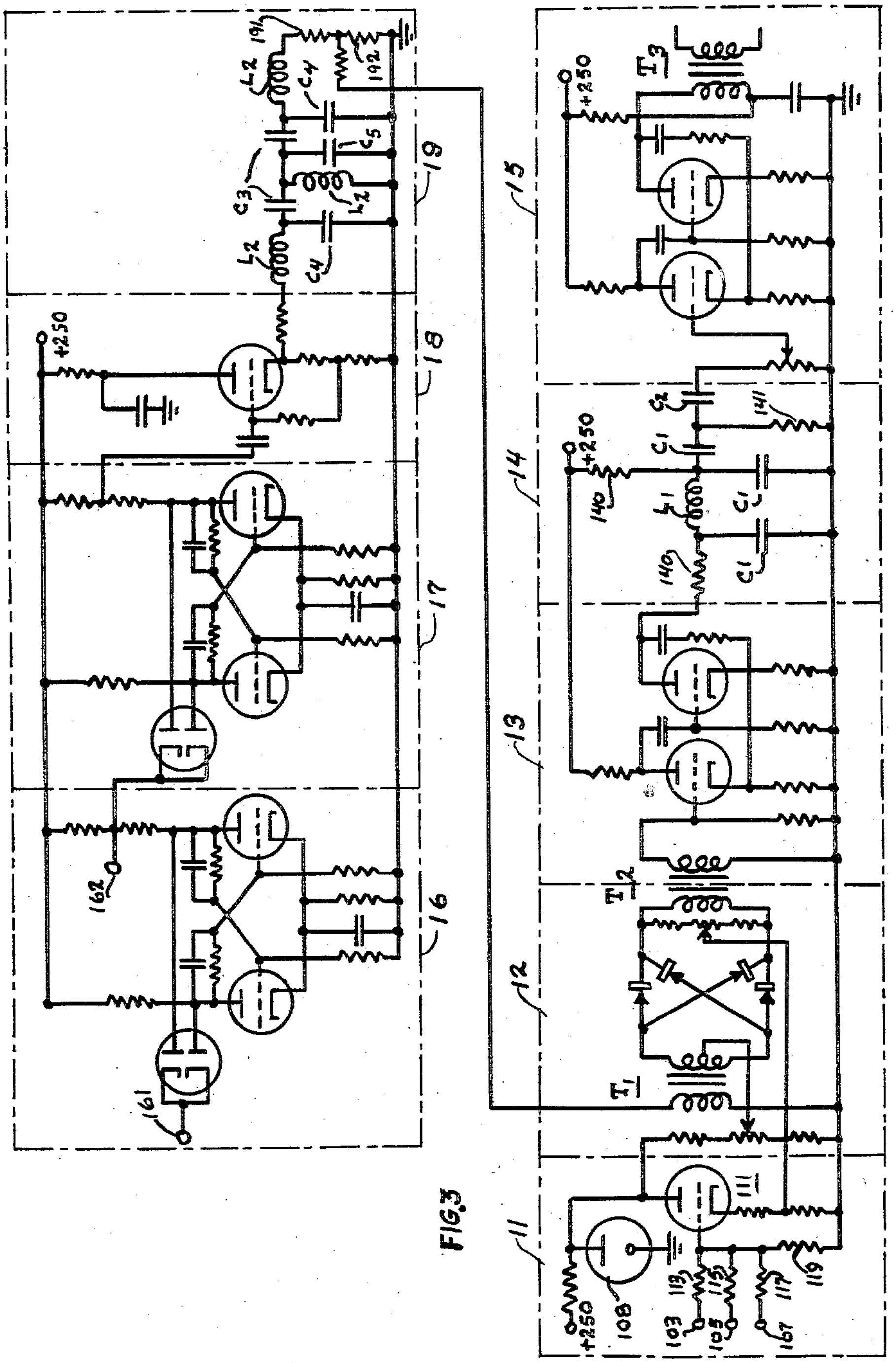
Figure 4:
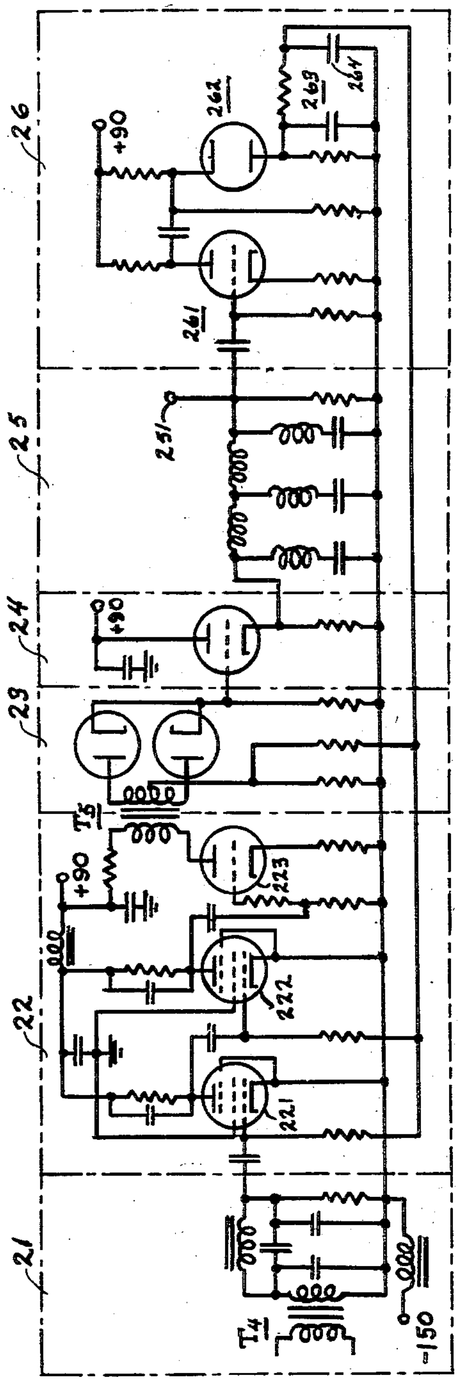
Figure 5:
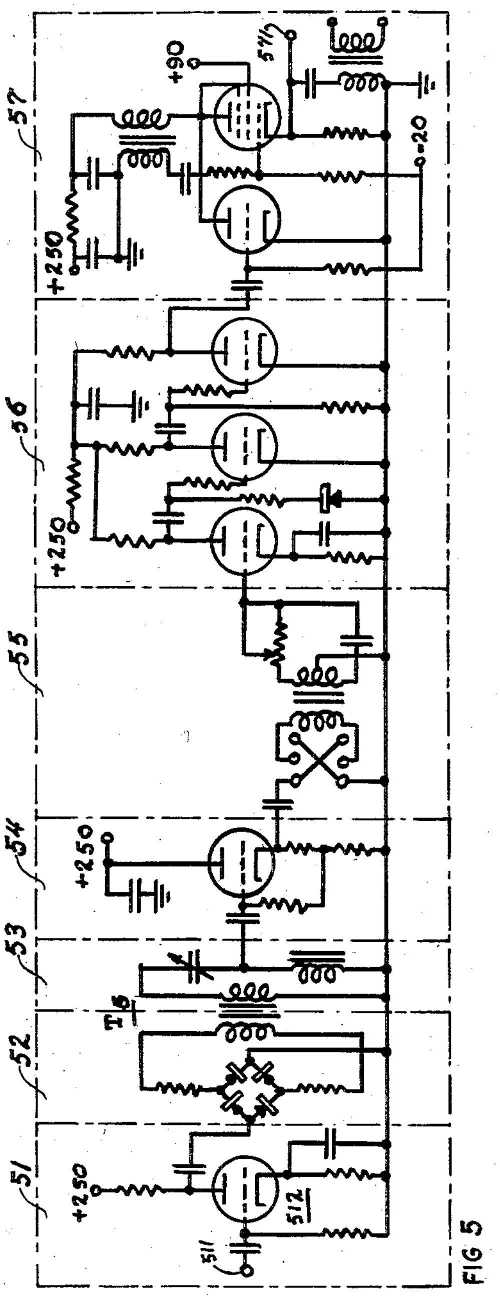
Figure 6:
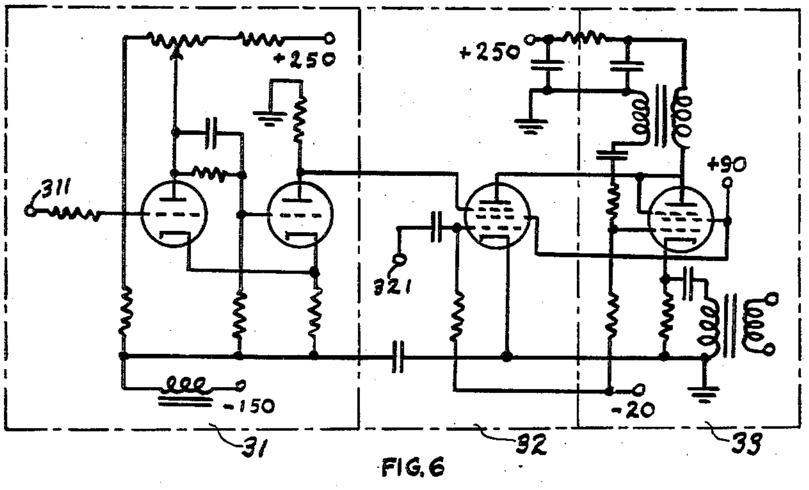
Figure 7:
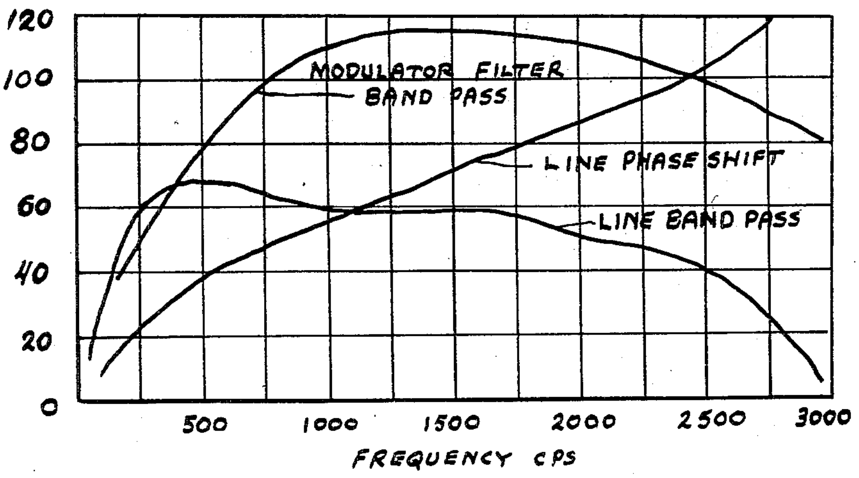

In the accompanying drawings, Fig. 1 is a block diagram schematicaly illustrating the modulator for the transmission of information in the form of a sequence of coded pulses according to the present invention, Fig. 2 is a block diagram schematically illustrating the demodulator for recovering the pulse information, Fig. 3 is a wiring diagram of the modulator of Fig. 1, Fig. 4 is a wiring diagram of the demodulator and automatic gain control circuits of Fig. 2, Fig. 5 is a wiring diagram of the timing pulse recovery circuit of Fig. 2, Fig. 6 is a wiring diagram of the pulse amplitude discriminator circuits of Figs. 2, Fig. 7 is a graph illustrating the characteristics of a typical line and of the modulator filter.

Referring to Figs. 1 and 3, a modulator for use with the present method of pulse transmission over land lines is shown.

Signal source 10 represents the elements of an information network supplying data for transmission to a remote location. Assuming a maximum data pulse transmission rate of 1600 pulses per second, signal source 10 provides a timing wave having a constant frequency of 1600 C. P. S. and trains of synchronized synch pulses and data pulses occurring at time intervals established in accordance with a predetermined code, such as the well known binary system.

The timing wave output of source 10 is fed to terminal 161 of a conventional scale-of-two circuit 16 so that an 800 cycle square wave output occurs at terminal 162. Synch pulses and data pulses from source 10 and the 800 C. P. S. output wave at terminal 162 of scale-of-two circuit 16 are fed to the input addiing network of mixing circuit 11 at terminals 103, 105 and 107, respectively. The values of resistors 113, 115, 117 and 119, of Fig. 3, typically may have the values of 180,000 ohms, 30,000 ohms, 15,000 ohms and 1,000 ohms, respectively, so that in the composite output wave form of cathode follower triode 111 data pulses have an amplitude one-half that of synch pulses while timing pulses have an amplitude one-tenth that of synch pulses. Cathode follower triode 111 serves to isolate the pulse sources from modulator 12.

As illustrated in Fig. 3, modulator 12 takes the form of a conventional varistor modulator. However, since the modulating signal is a series of unidirectional pulses, the usual connection of the modulating signal to the input transformer cannot be made; therefore the modulating signal is applied to the points normally used for carrier input and the 2000 C. P. S. carrier signal is fed to the input transformer $T_1$.

The output of modulator 12 is coupled by transformer $T_2$ to a conventional two stage triode amplifier 13, having sufficient feedback to insure stability of gain and linearity of response. The amplified signal is fed to band pass filter 14 which is designed to possess a smooth roll-off above 2000 C. P. S. and below 700 C. P. S., thus restricting the signal spectrum to the usable bandwidth of the average land line, as shown in Fig. 7. After further amplification in amplifier 15, which is identical in its characteristics to amplifier 13, the pulse modulated carrier is coupled to the line through impedance matching transformer $T_3$.

A tabulation is given below of the component parts of the particular band pass filter shown in Fig. 3 for filter 14, the values being expressed in ohms, henries and micromicrofarads:

| | |
|---|---|
| $L_1$ | 8 |
| $C_1$ | 1500 |
| $C_2$ | 300 |
| Resistor **140** | 51,000 |
| Resistor **141** | 200,000 |

The 800 C. P. S. output wave at terminal 162 is also fed to a second scale-of-two circuit 17 to produce an output square wave of 400 C. P. S. which is fed to band pass filter 19 through an isolating cathode follower 18. Narrow band pass filter 19 is designed to have a pass band lying between 1800 and 2100 C. P. S. Band pass filter 19 thereby selects the fifth harmonic of the 400 C. P. S. wave to produce a 2000 C. P. S. wave which is fed to transformer $T_1$ of modulator 12 as the carrier signal.

It is to be noted that this method of generating the 2000 C. P. S. carrier wave produces a carrier which is synchronized to the timing wave. In the present system wherein the ratio of carrier frequency to the maximum pulse rate is only 5 to 4, it has been found that the receiving end has improved reliability when a synchronous carrier is used. The need for carrier synchronism arises from the fact that the pulse spectrum derived from a switched carrier varies appreciably in shape depending upon the time of carrier switching, resulting in a variation of the shape and amplitude of the received pulse. When a synchronous carrier is used, the number of phases at which the carrier can be switched is resetricted to four, of which two are mirror images of the other two about the baseline.

If, for example, a maximum data pulse transmission rate of 1300 pulses per second is selected, a timing square wave of 650 C. P. S. is seen to be supplied from terminal 162 to the input of mixing circuit 11. Further, scale-of-two circuit 17 is then omitted and the 650 C. P. S. square wave is fed directly through cathode follower 18 to band pass filter 19, which in this instance selects the third harmonic of the 650 C. P. S. wave to provide a carrier wave frequency of 1950 C. P. S.

A filter design suitable for use as band pass filter 19 may have the following values of components as shown in Fig. 3:

| | | |
|---|---|---|
| $L_2$ | henries | 1.6 |
| Resistor **191** | ohms | 820 |
| Resistor **192** | do | 2200 |
| $C_3$ | micromicrofarads | 456 |
| $C_4$ | do | 3740 |
| $C_5$ | do | 3380 |

It is to be noted that the power supply for mixing cathode follower 11 and modulator 12 is preferably taken from a stabilized voltage source, as indicated by the gaseous voltage regulator tube 108.

Conventional computer devices are well known for coding information into square wave signals or into a train of pulses occurring at time intervals spaced in accordance with a selected logic such as the binary system. Since the present invention is concerned only with providing land line connections between remote elements of an information network, the details of signal source 10 are omitted.

For certain types of land lines, detection of the transmitted signal can be achieved after amplification by a conventional amplitude discriminator circuit such as the well known Schmitt trigger circuit. Further, recovery of the timing wave is no problem since a filter tuned to the maximum pulse rate will provide the timing reference in its output.

This simple detection system cannot be used on certain carrier type lines wherein the frequency of the transmitted signal is not kept intact. On these lines the transmitted signal is heterodyned to a high frequency by a local oscillator. The carrier and one set of sidebands are then suppressed and only the remaining sidebands are sent to the receiving terminals. At the receiving end, the transmitted sidebands are heterodyned against a local oscillator and the resulting low frequency signal is filtered out. In these carrier systems the two oscillators are not synchronized although their frequencies are very nearly equal. The effect of these oscillator discrepancies is an apparent continuous phase change of the output signal.

Thus, any attempt to detect the amplitude of a pulse by a simple amplitude discriminator fails, since as the phase changes the amplitude of a single loop of sine wave can drop below the amplitude discriminator response level. Further, the timing signals also drift constantly in phase with respect to the transmitted signal and therefore cannot be recovered by simple circuits.

With reference to Figs. 2 and 4, a demodulator or detector is shown which obviates the effects of the frequency change experienced with the above mentioned carrier type lines by using envelope detection. The line is coupled by transformer $T_4$ to low pass input filter 21 with a cutoff at 5 kc. The input filter 21 functions to attenuate any locally generated high frequency noise. The filtered signal is then fed to an amplifier 22 with automatic gain control to prevent line gain fluctuations from affecting the amplitude discriminator circuits adversely. The automatic gain controlled pentodes 221 and 222 are followed by a high gain triode amplifier 223. The gain is kept relatively low in the gain controlled stages to minimize distortion. The amplified signal output is coupled by transformer $T_5$ to a full wave rectifier 23. The rectifier output is then coupled to a low pass filter 25 through cathode follower 24. The low pass filter 25 acts to smooth the rectifier output and any frequency components in the signal above 1000 C. P. S. The smoothed output of filter 25, representing the original modulation envelope, is connected to terminal 251.

It was pointed out above that the entire signal, including the timing information, appears at the transmitting end as a modulated 2000 C. P. S. carrier. Hence the transmitted signal is composed of a carrier and related sidebands, the sideband frequencies depending on the nature of the modulation. If the oscillators in the carrier telephone systems, referred to above, are not synchronized, the frequency of the 2000 C. P. S. is changed by the frequency discrepancy of the two oscillators but the relation between the carrier and the sidebands remains intact. Thus, when the received signal is full wave rectified and smoothed by filtering, the envelope of the original modulation is recovered. Since the timing signal was part of the modulation envelope, it too can be recovered at the receiving end.

The output of filter 25 is fed to the automatic gain control circuit 26, including an amplifier triode 261 which inverts the signal to provide the proper polarity for developing a negative bias on the gain controlled stages of amplifier 22. The inverted output signal of triode amplifier 261 is applied to peak detector 262, the output of which is applied to the storage network 263, the storage capacitor 264 of which develops a voltage proportional to the peak amplitude of the synch pulses. The output voltage of storage capacitor 264 is applied as a bias voltage to pentodes 221 and 222 of amplifier 22 to control the gain thereof to maintain the amplitude of the modulation envelope substantially constant independently of line changes or changes of line.

With reference to Figs. 2 and 5, a circuit for deriving accurately spaced timing pulses from the modulation envelope is shown. The signal output of terminal 251 is fed to differentiating circuit 51 at terminal 511 which acts as a high pass filter to remove the D.-C. and low frequency components of the signal. The differentiated signal appears as a sine wave of 800 C. P. S. of varying amplitude. After amplification by triode 512, the 800 C. P. S. sine wave is applied to full wave rectifier 52, which in effect detects the zero crossings of the 800 C. P. S. signal. The output is a variable amplitude D.-C. voltage pulsating at 1600 C. P. S. The rectified signal output of rectifier 52 is applied through a matching transformer $T_6$ to a series tuned filter 53 resonant at 1600 C. P. S. The "ringing" characteristic of the series tuned circuit energized periodically by the output of rectifier 52 produces a 1600 C. P. S. sine wave. The 1600 C. P. S. sine wave is coupled to a manual phase shifter 55 through cathode follower 54. The phase shifter 55 is employed in order to obtain the proper relationship of the timing pulses with respect to the output of the synch pulse and data pulse amplitude discriminators 31 and 41. The phase shifted 1600 C. P. S. sine wave is amplified, clipped and shaped in the successive stages of pulse shaper 56 to form narrow trigger pulses required to trigger a conventional blocking oscillator 57. The output of blocking oscillator 57 at terminal 571 is seen to be a series of accurately spaced timing pulses occurring at the maximum information pulse rate of 1600 pulses per second.

Now referring to Fig. 2 as well as Fig. 6, the output from terminal 251 of low pass filter 25 is also fed to the input terminal 311 of synch pulse and data pulse discriminators 31 and 41 respectively. Since these two channels are identical except for bias levels, only the synch pulse channel is illustrated. The voltage level slicers or pulse amplitude discriminators take the form of the well known Schmitt trigger circuit which is biased to select only those pulses which have sufficient voltage amplitude to trigger the input tube. The output wave form of circuits 31 and 41 is a rectangular wave having a duration time corresponding to the time an input pulse exceeds the predetermined voltage level at which the circuit is triggered.

The output signals of voltage level slicers 31 and 41 are fed as rectangular gating pulses to gate tubes 32 and 42 respectively. Timing pulses from the output terminal 571 of blocking oscillator 59 are also fed to terminal 321 of gate tubes 32 and 42. At time coincidence of timing pulses and gating voltages, gate tubes 32 and 42 provide accurately spaced output pulses occurring at time intervals accurately related to the time spacing of synch and data pulses in the original signal. The output pulses of gate tubes 32 and 42 are fed as trigger pulses to blocking oscillators 33 and 43 respectively.

Thus it is seen that the output of the demodulator consists of blocking oscillator pulses of either polarity on three channels, 33, 43 and 57. By suitably selecting blocking oscillator constants of conventional design, these pulses can be given an amplitude of 35 volts across a load of 100 ohms and a time duration of 0.5 microsecond. One channel 33, contains reference and frame synch pulses. A second channel 43 contains data pulses plus reference and frame synch pulses. The third channel 57 contains timing pulses at 1600 pulses per second. If pulses are present on all three channels in a given time interval, they occur simultaneously.

Having thus described the invention, we claim:

1. The method of transmitting information in the form of a sequence of coded pulses including reference pulses and data pulses to a remote receiver over a land line having a frequency transmission band limiting the maximum pulse repetition rate comprising the steps of, generating a train of timing pulses having a predetermined constant repetition rate, generating a carrier wave from said timing pulses, said carrier being synchronized and locked in phase to said train of timing pulses at a multiple of a subharmonic thereof to have a frequency at the high frequency limit of the transmission of said line, mixing said sequence of coded pulses and said train of timing pulses to produce a composite train of pulses wherein reference pulses have a greater amplitude than timing pulses and data pulses have an intermediate amplitude, amplitude modulating said carrier wave by said composite pulse train to produce a multiple amplitude signal, filtering said multiple amplitude signal to restrict the signal spectrum to the usable frequency transmission band of said line, and impressing said filtered multiple amplitude signal on said line as the input thereto.

2. The method of recovering information transmitted as a multiple amplitude pulsed carrier wave, wherein reference pulses have a greater amplitude than timing pulses and data pulses having an intermediate amplitude occur at time intervals determined by a selected code, over land lines between remote elements of an information network, comprising the steps of, rectifying and filtering the output of said line to recover the modulation envelope of the signal transmitted thereby, differentiating and rectifying said modulation envelope to recover a variable amplitude unidirectional voltage pulsating at the maximum data pulse transmission rate, converting said pulsating voltage to a sine wave having a frequency equal to said maximum data pulse transmission rate, clipping and differentiating said sine wave to obtain a train of accurately spaced timing pulses, separating said reference, data and timing pulses present in said multiple amplitude modulation envelope by pulse amplitude discrimination, and combining separated reference and data pulses with said train of timing pulses to recover by time coincidence reference pulses and data pulses at accurately spaced time intervals.

3. The method of transmitting information, occurring as a coded sequence of pulses including reference pulses and data pulses spaced at time intervals determined by a selected code, between remote elements of an information network over land lines having a frequency transmission bandwidth restricting the maximum data pulse transmission rate, comprising the steps of, generating a rectangular timing wave having a constant predetermined frequency corresponding to one-half the maximum pulse transmission rate, generating a synchronized carrier wave from said timing wave, said carrier wave being locked and phased to said timing wave at a multiple of a subharmonic thereof to have a frequency at the high frequency portion of the bandwidth of said line, mixing said timing wave and said pulse sequence to derive a composite train of pulses wherein reference pulses have a greater amplitude than timing pulses and data pulses have an intermediate amplitude, amplitude modulating said carrier wave with said composite pulse train to produce a multiple amplitude pulsed carrier signal, filtering said pulsed carrier signal to restrict the signal spectrum to the frequency transmission bandwidth of said line, impressing said filtered pulsed carrier signal as the input to said line, rectifying and filtering the output of said line to recover the modulation envelope of the signal transmitted thereby, differentiating and rectifying said modulation envelope to recover a variable amplitude unidirectional voltage pulsating at said maximum data pulse transmission rate, converting said pulsating voltage to a sine wave having a frequency equal to said maximum data pulse transmission rate, clipping and differentiating said sine wave to obtain a train of accurately spaced timing pulses, separating said reference, data and timing pulses present in said modulation envelope by pulse amplitude discrimination, and combining separated reference pulses and data pulses with said train of accurately spaced timing pulses to recover by time coincidence reference pulses and data pulses at accurately spaced time intervals.

4. Apparatus for accepting coded information in the form of synchronized trains of timing pulses, reference pulses and data pulses, wherein said data pulses occur at time intervals following reference pulses determined by a selected code and supplying said information in substantially the same form over a land line to a remote element of an information network comprising, means for combining said timing pulses, reference pulses and data pulses to form a composite pulse train wherein reference pulses are given a greater amplitude than timing pulses and data pulses are given an intermediate amplitude, means responsive to said train of timing pulses to generate a sinusoidal carrier wave synchronized and locked in phase to said timing pulses at a frequency related to said timing pulse repetition rate as a multiple of a subharmonic thereof, said carrier wave frequency lying in the high frequency portion of the frequency transmission bandwidth of said line, means for modulating said carrier wave with said composite pulse train to derive a multiple amplitude pulsed carrier signal, means for filtering said signal to restrict the frequency spectrum thereof to the bandwidth of said line, means for coupling said filtered signal to said line, a circuit responsive to the output of said line to recover the modulation envelope of the signal transmitted thereby, said circuit including an amplifier, a rectifier and a filter, a pair of pulse amplitude discriminator circuits responsive to said modulation envelope, the first of said discriminators being biased to be responsive to signal amplitudes corresponding to reference signals and non-responsive to amplitudes of data signals and timing signals, the second of said discriminators being biased to be responsive to signal amplitudes corresponding to reference signals and data signals and non-responsive to amplitudes of timing signals, a timing wave recovery circuit including a differentiating network, a full wave rectifier and a tuned filter responsive to said modulation envelope to generate a sine wave having a frequency equal to the maximum data pulse rate, a wave shaping circuit driven by said sine wave to produce a series of accurately spaced trigger pulses, and means to combine the outputs of said first and second discriminators with said trigger pulses to produce at time coincidence thereof first output pulses corresponding to reference signals at accurately spaced time intervals, second output pulses corresponding to reference signals and data signals at accurately spaced time intervals and third output pulses corresponding to timing signals.

5. A modulator for the pulsed carrier transmission of coded information over a land line as a multiple amplitude signal comprising, a data source supplying synchronized trains of timing pulses, reference pulses and data pulses, said data pulses being spaced from each other and from said reference pulses at time intervals related to a selected code, means for combining said timing pulses reference pulses and data pulses to form a composite pulse train wherein reference pulses are given a greater amplitude than timing pulses and data pulses are given an intermediate amplitude, means responsive to said timing pulses to generate a sinusoidal carrier wave synchronized and locked in phase to said timing pulses at a frequency related to said timing pulse repetition rate as a multiple of a subharmonic thereof, said carrier wave frequency lying in the high frequency portion of the transmission bandwidth of said line, means for modulating said sine wave with said composite train of pulses to derive a multiple amplitude pulsed carrier signal, and means for filtering said signal to restrict the frequency spectrum thereof to the usable transmission bandwidth of said line.

6. A modulator for the pulsed carrier transmission of information over a land line as a multiple amplitude signal containing timing signals at a first amplitude, reference signals at a second greater amplitude and data signals at a third intermediate amplitude comprising, a source of data supplying synchronized trains of reference, data and timing pulses, a resistance adding network having a plurality of arms connected respectively to reference pulses, data pulses and timing pulses from said source, said arms being so proportioned in resistance that a composite pulse train is produced wherein reference pulses are given a greater amplitude than timing pulses and data pulses are given an intermediate amplitude, a carrier wave generator responsive to said train of timing pulses to produce a sine wave synchronized and locked in phase to said timing pulses at a frequency related to said timing pulse repetition rate as a multiple of a subharmonic thereof, said sine wave frequency lying in the upper portion of the frequency transmission bandwidth of said line, means for amplitude modulating said sine wave with said composite pulse train to produce a multiple amplitude pulsed carried signal, a filter having a band pass characteristic substantially the same as the frequency transmission bandwidth of said line, means for applying said multiple amplitude pulsed carrier signal to said filter to restrict the signal spectrum to the usable bandwidth of said line, and means for coupling the output of said filter to the input of said line.

7. A modulator for the pulsed carrier transmission of coded information over a land line as a multiple amplitude signal comprising, a data source supplying synchronized trains of timing pulses, reference pulses and data pulses, data pulses following reference pulses and each other at time intervals determined by a selected code, a resistance adding network having a plurality of arms connected respectively to timing pulses, reference pulses and data pulses at said source, said arms being proportional in resistance to produce a composite pulse train wherein reference pulses are given a greater amplitude than data pulses and data pulses are given a greater amplitude than timing pulses, a frequency divider responsive to said timing pulse train to produce a second train of pulses having a reduced pulse repetition rate, a filter having a narrow band pass characteristic lying in the high frequency region of the transmission bandwidth of said line, means for feeding said second train of pulses to said filter to select a harmonic thereof for use as a carrier wave synchronized and locked in phase to said train of timing pulses, a modulator responsive to said carrier wave and said composite pulse train to produce a multiple amplitude pulsed carrier signal, a second filter, said second filter having a band pass characteristic substantially the same as the transmission bandwidth of said line, means for applying said multiple amplitude signal to said second filter to restrict the frequency spectrum thereof to the usable bandwidth of said line, and an impedance matching transformer for coupling the output signal of said second filter to said line.

8. A demdoulator for recovering information transmitted over a land line as a multiple amplitude pulsed carrier signal containing timing signals at a first amplitude, reference signals at a second greater amplitude and data signals at a third intermediate amplitude comprising, a circuit including an amplifier, a full wave rectifier and a filter responsive to the output signal of said line to recover the modulation envelope of the signal transmitted thereby, a first amplitude discriminator biased to be responsive to input signal amplitudes corresponding to reference signals and non-responsive to data and timing signal amplitudes, a second amplitude discriminator biased to be responsive to input signal amplitudes corresponding to reference signals and data signals but non-responsive to timing signal amplitude, means for feeding said modulation envelope to said first and second amplitude discriminators to separate reference signals and data signals from timing signals, a timing wave recovery circuit having in cascade connection a differentiating network, a full wave rectifier and a filter tuned to a frequency corresponding to the maximum data pulse rate, means for feeding said modulation envelope to said timing wave recovery circuit to develop a sine wave at the resonant frequency of said filter, a wave shaping circuit driven by said sine wave to produce a series of accurately spaced trigger pulses, a first output channel to combine the output of said first amplitude discriminator with said trigger pulses to produce at time coincidence thereof a first output of reference pulses at accurately spaced time intervals, a second output channel to combine the output of said second amplitude discriminator with said trigger pulses to produce at time coincidence thereof a second output of reference and data pulses at accurately spaced time intervals, and a third output channel responsive to said trigger pulses to produce a third output of accurately spaced timing pulses.

9. A demodulator for recovering information transmitted over a land line as a multiple amplitude pulsed carrier signal containing timing signals at a first amplitude, reference signals at a second greater amplitude and data signals at a third intermediate amplitude comprising, an amplifier, an impedance matching transformer for coupling the output signal of said line to the input of said amplifier, a full wave rectifier circuit including a low pass filter coupled to the output of said amplifier to recover the modulation envelope of the signal transmitted by said line, an automatic gain control circuit including a polarity inverting amplifier, a peak detector and an integrator, means applying said modulation envelope to said automatic gain control circuit, whereby a control voltage proportional to the peak amplitude of said modulation envelope is obtained, means applying said control voltage to said amplifier as a bias voltage thereby controlling the gain thereof to obviate line gain changes, a pair of pulse amplitude discriminator circuits responsive to said modulation envelope, the first of said amplitude discriminators being biased to be responsive to signal amplitudes corresponding to reference signals and non-responsive to data signal amplitudes and timing signal amplitudes, the second of said amplitude discriminators being biased to be responsive to signal amplitudes corresponding to reference signals and data signals and non-responsive to timing signal amplitudes, a timing wave recovery circuit including a differentiating network and a full wave rectifier responsive to said modulation envelope to produce a variable amplitude unidirectional voltage pulsating at a frequency corresponding to the maximum data signal repetition rate, a tuned filter resonant at the frequency of the maximum data signal repetition rate, means energizing said filter by said pulsating unidirectional voltage whereby the ringing of said filter generates a sine wave, a wave shaping amplifier circuit responsive to said sine wave for producing a series of accurately spaced timing trigger pulses, a first time coincidence circuit responsive to the output of said first amplitude discriminator and said series of trigger pulse to produce output pulses corresponding to reference signals at accurately spaced time intervals, a second time coincidence circuit responsive to the output of said second amplitude discriminator circuit and said series of trigger pulses to produce output pulses corresponding to referendce and data signals at accurately spaced time intervals, and a plurality of blocking oscillators, means applying the output of said first coincidence circuit to trigger the first of said blocking oscillators, means applying the output of said second coincidence circuit to trigger the second of said blocking oscillators, and means applying said series of accurately spaced trigger pulses to trigger the third of said blocking oscillators, whereby blocking oscillator pulses of either polarity are supplied on a plurality of output channels corresponding to reference pulses, data pulses plus refeernce pulses and timing pulses respectively.

10. The method of land line transmission of coded information occurring as reference pulses and data pulses spaced at time intervals synchronized to a timing wave comprising the steps of, generating a carrier wave synchronized and locked in phase to said timing wave at a multiple of a subharmonic thereof to have a frequency at the upper end of the frequency transmission band of said land line, mixing said reference pulses and said data pulses proportionally to produce a composite pulse train wherein reference pulses have a greater amplitude than data pulses, amplitude modulating said carrier wave with said composite pulse train to produce a multiple amplitude pulsed carrier signal, and filtering said pulsed carrier signal to restrict the signal frequency spectrum to the undistorted frequency transmission band of said line before application thereto.

11. The method of transmitting coded information, occurring as synchronized reference pulses and data pulses spaced from each other by time intervals determined by a selected code, over a land line having a frequency transmission band limiting the maximum pulse repetition frequency comprising the steps of, adding said reference pulses and said data pulses proportionally to derive a composite multiple amplitude pulse train wherein reference pulses have a substantially greater amplitude than data pulses, generating a carrier wave having a frequency near the high frequency end of the transmission band of said line and related harmonically to said maximum pulse repetition frequency, amplitude modulating said carrier wave in response to said pulse train to produce a multiple amplitude pulsed carrier signal, filtering said multiple amplitude pulsed carrier signal to remove frequency components lying outside said frequency transmission band of said line, and impressing said filtered pulsed carrier signal on said line as the input thereof.

12. The method of land line transmission of coded information occurring as reference pulses and data pulses spaced at time intervals synchronized to a timing square wave comprising the steps of, generating a carrier wave synchronized and locked in phase to said timing wave at a multiple of a subharmonic thereof to have a frequency at the high frequency end of the frequency transmission band of said line, adding said reference pulses and said data pulses to said timing wave proportionately to produce a composite pulse train wherein reference pulses have a greater amplitude than timing pulses and data pulses have an intermediate amplitude, modulating said carrier wave with said composite pulse train to produce a multiple amplitude pulsed carrier signal, and filtering said pulsed carrier signal to restrict the frequency spectrum to said signal to the usable bandwidth of said line before application thereto.

13. The method of transmitting coded data between remote elements of an information network over land lines having a usable frequency bandwith limiting the maximum pulse repetition frequency of data occurring as reference pulses and data pulses spaced at time intervals synchronized to a timing square wave comprising the steps of, adding said reference pulses and said data pulses to said timing wave proportionately to produce a multiple amplitude pulse train wherein reference pulses have a greater amplitude than data pulses and data have a greater amplitude than timing pulses, generating a carrier wave having a frequency near the high frequency end of the transmission band of said line and synchronized to a harmonic relation to said timing wave, amplitude modulating said carrier wave with said pulse train to produce a pulsed carrier signal having a multiple amplitude modulation envelope, filtering said pulsed carrier signal to restrict the frequency spectrum thereof to said usable bandwidth of said line, impressing said filtered pulsed carrier signal as the input to said line, rectifying and filtering the output of said line to recover the multiple amplitude envelope of the transmitted signal, separating reference pulses, data pulses and timing pulses present in said modulation envelope by pulse amplitude discrimination, differentiating and rectifying said modulation envelope to recover a timing signal, deriving from said timing signal a train of accurately spaced timing pulses, and combining separated reference pulses and data pulses with said train of timing pulses to recover by time coincidence reference pulses and data pulses at accurately spaced time intervals.

References Cited in the file of this patent

UNITED STATES PATENTS 2,716,189 Ayres ---------------- Aug. 23, 1955